United States Patent Office 3,730,795
Patented May 1, 1973

3,730,795
FILAMENT WINDING METHOD
Jonas Medney, Oceanside, and Donald J. Baumgarten, Smithtown, N.Y., assignors to Koppers Company, Inc.
Original application Dec. 18, 1968, Ser. No. 784,812, now Patent No. 3,607,566, dated Sept. 21, 1971. Divided and this application Apr. 14, 1971, Ser. No. 134,087
Int. Cl. B65h 54/00
U.S. Cl. 156—169                     4 Claims

ABSTRACT OF THE DISCLOSURE

Filament winding apparatus includes rotatable elements mounting supports between which mandrels, on which filament rovings are to be wound, are mounted. A winding head reciprocates along the length of the mandrel located at a winding station. When wound, the elements are rotated to place an unwound mandrel in the winding position. After the filament roving is severed, a wrap-cylinder helps to start to wrap or wind the filament roving on the unwound mandrel, while the wound mandrel is removed, moved into a curing oven, and replaced by an unwound mandrel.

A plurality of supports mounted adjacent a pair of winding heads operated simultaneously make it possible to wind two mandrels simultaneously.

CROSS REFERENCE TO RELATED APPLICATION

This is a divisional of application Ser. No. 784,812, filed Dec. 18, 1968, now Pat. No. 3,607,566, issued Sept. 21, 1971.

BACKGROUND OF THE INVENTION

In the manufacture of filament reinforced resin tubular products, it has been customary heretofore to insert a mandrel into a lathe-like apparatus and then to wind resin impregnated glass filament rovings on the mandrel until a sufficient thickness of glass was wound thereon to constitute a length of pipe. The wound mandrel was then removed from the winding machine or lathe-like apparatus and, while another mandrel was being inserted into the winding machine, the wound mandrel was manually conveyed to a curing area or oven.

Those skilled in the art know how laborious is this way of making filament wound resin tubular products. Each mandrel is usually over twenty feet long and each mandrel must be manually handled, carefully using a crane so as not to damage the glass winding. That there is a distinct need for apparatus that automatically loads mandrels into a winding machine, winds resin impregnated filaments on the mandrel, removes the wound mandrel, and loads another mandrel into the machine, is quite apparent to the skilled artisan.

How the equipment and method of the present invention effectively carries out such a program is more completely set forth in the following description of one embodiment of apparatus in accordance with the invention.

SUMMARY OF THE INVENTION

The method for winding mandrels with filamentary material comprises the steps of mounting the mandrels between supports that are mounted to spaced apart rotatable elements; such mandrels being parallel to each other and parallel to an axis about which the elements rotate. A filamentary winding head reciprocates lengthwise of the mandrel and resin impregnated rovings are wound helically on the mandrel, as the mandrel rotates at a winding station. Thereafter, the elements are rotated to move the wound mandrel to another spaced apart location and, simultaneously, to move an unwound mandrel to the winding location. The filamentary material is severed at a point between the winding location and the other location and a wrap-cylinder engages the filamentary material to help to wrap or wind it around the unwound mandrel. The wound mandrel is removed from the supports and is then carried into a curing oven while an unwound mandrel moves automatically into a loading position at which it is engaged by the supports mounted in spaced apart rotatable elements.

For a further understanding of the invention and for advantages and features thereof, reference may be made to the following description and the drawings which illustrate a preferred embodiment of equipment which is in accordance with the invention and which is suitable for practicing the method of the invention.

DETAILED DESCRIPTION

Figure 1:
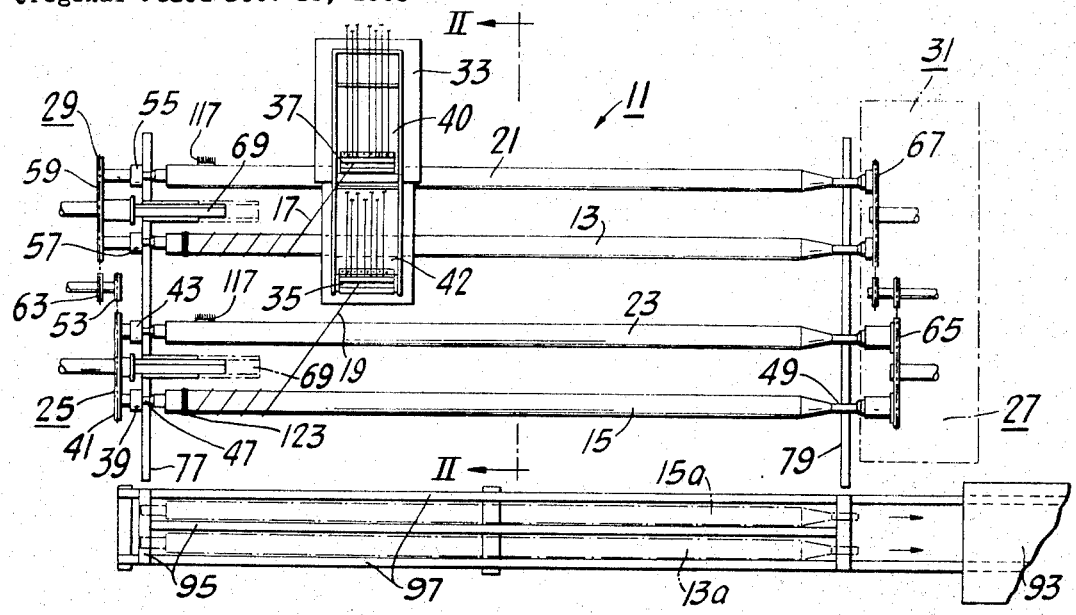
FIG. 1 is a schematic plan view of an embodiment of apparatus in accordance with the invention.

FIG. 1 is a plan view, in schematic form, of apparatus 11 in accordance with the invention that is suitable for automatically and simultaneously loading, winding, discharging, and reloading two mandrels 13, 15; the mandrels 13, 15 being wound with resin impregnated glass filament rovings 17, 19 respectively. Actually, there are four mandrels 13, 15 and 21, 23 in the apparatus at the same time, but only two of the mandrels 13, 15 are being wound simultaneously. The other two mandrels 21, 23 are being unloaded and new unwound mandrels are being loaded into the machine during the winding of mandrels 13, 15.

The mandrels 15, 23 are paired together in that they are mounted to a mechanism 25 at the left-hand end of the apparatus 11 and to another mechanism 27 at the right-hand end of the apparatus 11. Likewise, the mandrels 13, 23 are paired together and are similarly mounted to the left 29 and right 31 hand mechanisms. The mechanisms 25, 29 comprise the head stock and chuck mechanisms, and the mechanisms 27, 31 comprise the tail stock mechanisms.

A carriage 33 is arranged to move back and forth in reciprocatory motion along one side of the apparatus 11. The carriage 33 includes a pair of winding heads 35, 37 (see FIG. 2) that guide the plurality of rovings 17, 19 onto the mandrels 13, 15. The winding heads 35, 37 are conventional and they change position automatically each time they reach the end of a pass along the length of the mandrel, as is customary in filamentary winding.

The filamentary rovings 17, 19 lead from a plurality of spools (not shown) and pass through resin containing vessels 40, 42 mounted on the carriage 33 adjacent the respective winding heads 35, 37. The filamentary rovings 17, 19 become resin impregnated in the containers 40, 42 and then are guided by the winding heads 35, 37 onto the mandrels 13, 15.

The head stock and chuck mechanisms 25, 29 are similar, as are the tail stock mechanisms 27, 31. The mechanism 25 comprises a chuck 39 which is secured to a gear wheel 41, about where shown in FIG. 2. The chuck 39 is located diametrically opposite another similar chuck 43, and both chucks 39, 43 are centered on the same circle, having its center at the center 45 of the gear wheel 41. The chucks 39, 43 are motivated by suitable known mechanisms wherefore they move laterally, referring to FIG. 1, to engage and disengage one end 47 of the mandrel 15. The other end 49 of the mandrel 15 is similarly engaged by a tail stock of known type. The chucks 39, 43 are also rotatable about their own axis and the axis of the mandrels in a known manner.

Figure 2:
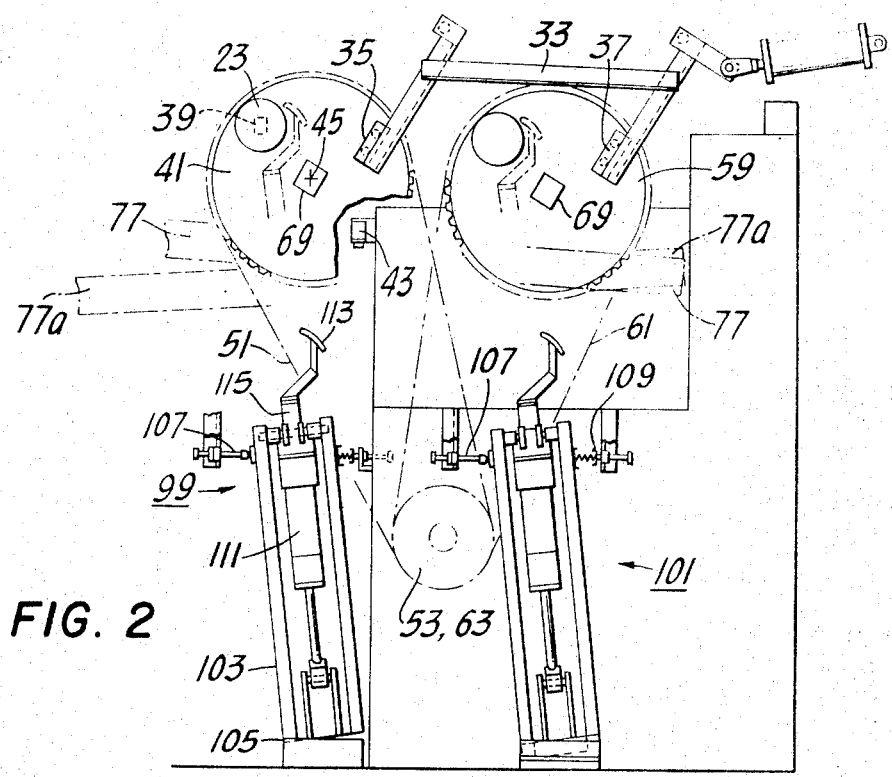
FIG. 2 is a schematic sectional elevational view along line II—II of FIG. 1.

The gear wheel 41 is connected by a chain drive 51 to a power driven pinion 53 (FIG. 2); wherefore, when one mandrel 23, for example, has been wound with resin impregnated filament glass roving material, it is rotated from the winding position, where shown in FIG. 2, to the unloading position and at the same time an unwound mandrel is rotated from the unloading position to the winding position.

Similarly, the head stock and chuck mechanism 29 includes a pair of chucks 55, 57 that are mounted to a gear wheel 59 (FIG. 2), and the gear wheel 59 is also connected by a chain drive 61 to a separately powered pinion 63. The pair of chucks 55, 57 may also be motivated laterally, referring to FIG. 1, as well as rotated by known mechanisms.

In like manner, the tail stock mechanisms 27, 31 include powered gear wheels 65, 67 that are motivated by chain drives and engage powered pinions (not shown).

Both the chucks 39, 43, and 55, 57 and the tail stock mechanisms 27, 31 are adapted to move laterally and thereby to engage and disengage automatically the ends of the mandrels 13, 15, and 21, 23.

Figure 3:
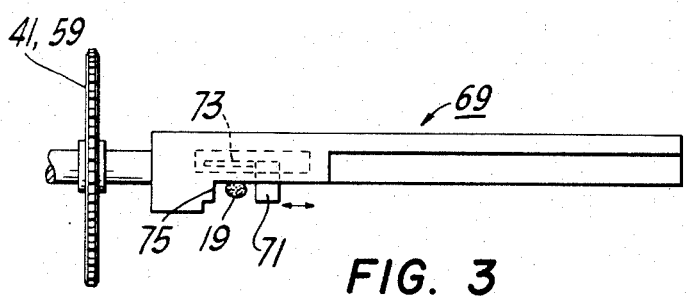
FIG. 3 is a schematic view of a roving cutting mechanism.

Centered in each head stock gear wheel 41, 59 is a horizontally extending filament cutting mechanism 69 (FIG. 3). The mechanism 69 includes a blade 71 that is mounted to a laterally moving rod 73, such as a piston rod, that cooperates with a fixed guide 75 whereby a roving, such as 19, when positioned between the blade 71 and fixed guide 75, is severed as the blade 71 moves toward and passes the fixed guide 75.

Figure 4:
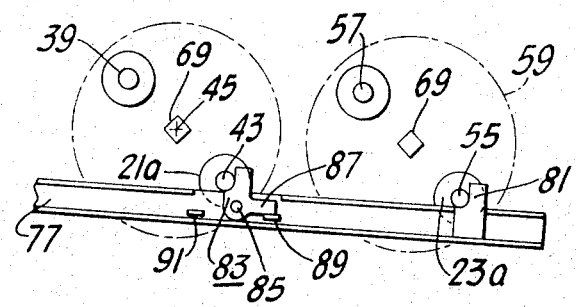
FIG. 4 is a schematic view of the left-hand end of the machine of FIG. 1 illustrating the loading of mandrels.

Adjacent each end mechanism 25, 27, and situated below the lower mandrel of each pair of mandrels, are horizontally and transversely extending skid rails 77, 79 (FIG. 1). The rails 77, 79 are pivoted about centers (not shown) so that they can be arranged to slope downward and toward the apparatus 11, as shown in FIG. 4, or to slope downward and away from the apparatus 11, as shown in FIG. 5.

The rails 77, 79 are each provided with one fixed mandrel stop 81 and one pivotable mandrel stop 83. The fixed stop 81 is a vertically oriented, arcuately notched plate that is contoured to the shape of the end of the mandrel, as shown in FIG. 4. The pivotable stop 83 is also a contoured and vertically oriented plate that is pivotable about pins 85. The pivotable stop 83 also has an arm 87 that is positioned at right angles to the rest of the stop and which engages a fixed abutment 89 on the rails 77. Opposite the fixed abutment 89 is another similar fixed abutment 91. As shown in FIG. 4, the rail 77 is sloping toward the right (toward the apparatus 11) and two unwound, new mandrels 21a and 23a are in position against the fixed stop 81 and the upright portion of the pivotal stop 83. These mandrels 21a and 23a are now ready to be engaged by the chucks 43 and 55 as well as by the tail stocks at the other end of the apparatus.

Figure 5:
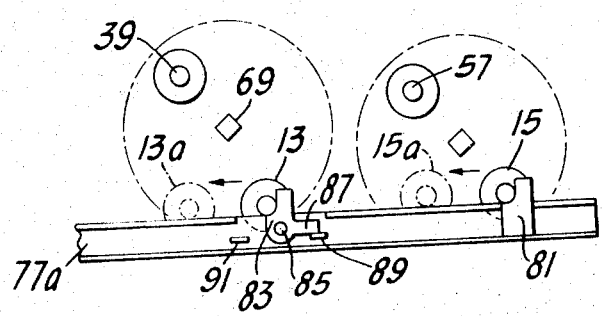
FIG. 5 is a schematic view, similar to that of FIG. 4, illustrating the unloading of mandrels.

FIG. 5 illustrates the position of the skid rails 77 and 79 when the wound mandrels 13, 15 are being unloaded. The wound mandrels 13a, 15a, after being automatically released from their respective chuck and tail stock mechanisms, roll in the direction of the arrows under the force of gravity toward the left and away from the apparatus 11. When the mandrel 15a engages the pivotal stop 83, it will pivot the stop so that the mandrel 15a passes the stop and the stop 83 will engage the fixed abutment, 91. The mandrel 13a, of course, has rolled down the skid rails to another location (FIG. 1) from which it is movable into a curing oven 93 by a suitable conveying mechanism 95 moving into and out of the curing oven 93 on rails 97.

FIG. 2 illustrates two wrap-cylinder assemblies 99, 101. Each wrap-cylinder assembly includes a pair of guideways 103, supported in a generally upright manner, which is pivotal about its lower end, as at 105, and in which is mounted at the top end between adjustable mounting assemblies 107 and a retainer spring assembly 109. Pivotally mounted to the guideways 103 is a cylinder piston assembly 111 that supports a wrap-cylinder 113 at the upper end.

The wrap-cylinder 113 is fixed to the head end of a piston rod 115 and, as shown in FIG. 2, is offset axially from the axis of the rod 115 for a purpose that will become evident hereinafter.

FIGS. 6a–6e schematically illustrate how the method of the invention is applied to the automatic winding of two mandrels 15, 23, supported in the gear unit 41 at the winding stations. It is understood that the description is applicable as well to the winding of the other two mandrels 13, 21 when, as described hereinafter, they are moved into a winding position. Actually, in practice, mandrels 13 and 15 are wound simultaneously.

It is assumed to begin with, that mandrel 15 is nearly wound with filament rovings 19, and that an unwound new mandrel 23 has been loaded into the apparatus 11 and now is in position for rotation into the winding position. Mandrel 15, of course, is wound in the usual manner by rotating the mandrel in the direction of the arrow A while, at the same time, the carriage 33 reciprocates along the length of the apparatus 11 and the winding head 35 guides the rovings onto the mandrel.

The carriage 33 starts at the left-hand end of the apparatus 11, and when the mandrel 15 is wound sufficiently, the mandrel ceases rotating. Then, gear 41 rotates counterclockwise, in the direction of the arrow B (FIG. 6a), and the mandrels 15 and 23 are then positioned as shown in FIG. 6b.

Figure 6A:
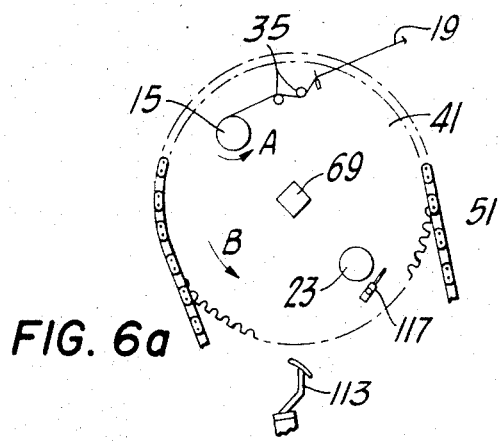
FIGS. 6a–6e illustrate schematically various positions of mandrels while practicing the method of the invention.
Figure 6D:
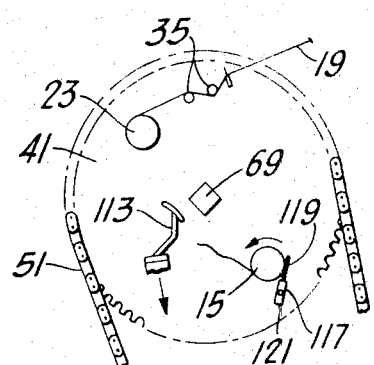
Figure 6B:
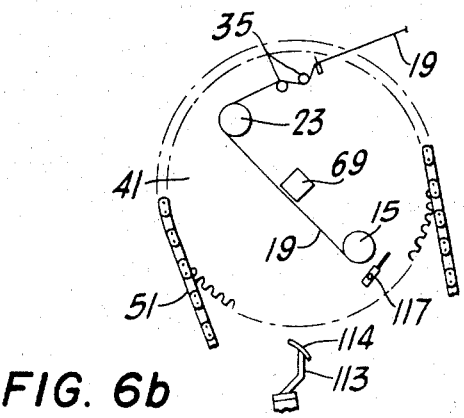
Figure 6E:
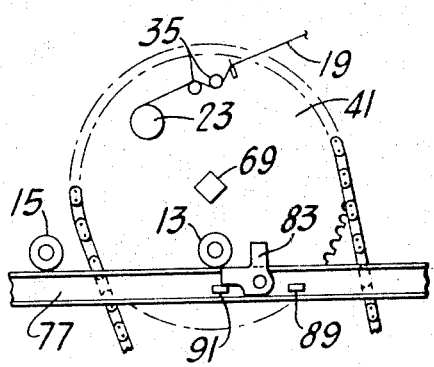
Figure 6C:
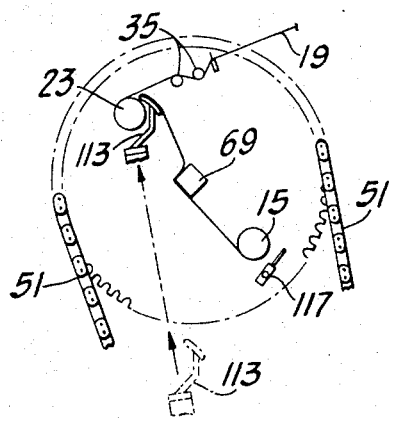

Thereupon, the wrap-cylinder 113 is elevated by the cylinder piston assembly 111 until the wrap-cylinder 113 reaches the position shown in FIG. 6c.

It should be noted that the filament roving 19 practically encircles the mandrel 23 and is disposed over the curved top surface 114 of the wrap-cylinder 113; the underside of the wrap-cylinder 113 being shaped to closely conform, in spaced apart relation, to the periphery of the resin impregnated filament wrappings on the mandrel 15.

The filament roving 19 then leads from the wrap-cylinder surface 114 and passes underneath the filament cutting mechanism 69 to the wound mandrel 15, as shown in FIG. 6c. Thereafter, the filament cutting mechanism 69 is actuated so that the blade 71 moves toward and past the fixed guide 75, thereby severing the filament 19 which, as shown in FIG. 3, is located between the fixed guide 75 and the movable blade 71.

As soon as the filament roving 19 has been severed, the mandrel 15 is rotated while a comb structure 117 (FIG. 1) is pivoted into engagement with the filament windings on the mandrel to make sure that the loose end of the filament roving 19 is pressed onto the windings at the left-hand end of the mandrel. The comb 117 comprises a plurality of finger-like rods 119 mounted in spaced apart parallel relation to a block 121 that is pivotally mounted adjacent the gear 41, in the position shown in FIGS. 6a–6d.

Simultaneously, the mandrel 23 is rotated until a build-up 123 of filament rovings occurs at the left-hand end (FIG. 1) whereupon, the carriage 33 is reciprocated along the length of the apparatus 11, to helically wind the filament roving 19 on the mandrel 23 in the same way the filament roving 19 is wound on the mandrel 15, as shown in FIG. 1.

After the comb structure 119 has pressed the loose end of the filament roving 19 against the windings on the mandrel 15, the comb structure 117 is pivoted clockwise to an inoperative position, shown in FIGS. 6a–6c. The wound mandrel 15 is now ready to be unloaded, rolled out of the way onto the conveying mechanism 95, and moved into the curing oven 93.

Those skilled in the art will understand that the operation described so far applies equally to the mandrels 13, 21. In practicing the method of the invention, it is preferred that two mandrels 13 and 15 be wound simultaneously; that two wound mandrels 13, 15 are unloaded at the same time; and that two new unwound mandrels 21a, 23a may be loaded simultaneously into the chuck and tail stock mechanisms.

To unload the wound mandrels 13, 15, the skid rails 77, 79 are raised so that they slope away from the apparatus 11, as suggested in FIG. 6e. The chucks 39, 57 and tail stocks move laterally to release the mandrels which are then supported on the rails 77, 79. The mandrels 13, 15 roll down the rails 77, 79 toward the left, to positions where shown. The mandrels 13a, 15a shown in FIG. 5 are shown in an intermediary position after movement has commenced. The pivotable stop 83 pivots to the position shown in FIG. 6e when the wound mandrel 13 passes by it; the pivotal stop 83 then engaging the fixed abutment 91. The wound mandrels 13, 15 move onto the conveying mechanism 95 and then into the curing oven 93.

When the wound mandrels 13, 15 have been removed into the curing oven 93, the apparatus 11 is ready to receive the two new, unwound mandrels. The loading of these mandrels has been described previously.

Winding of mandrels 21, 23 then continues until they are fully wound. Thereafter, the gear wheels 41, 59 to which they are mounted rotate counterclockwise (FIG. 6e) to bring the mandrels 21, 23 to diametrically opposite, unloading positions, and, thereafter, the operations described herein are repeated.

Figure 7:
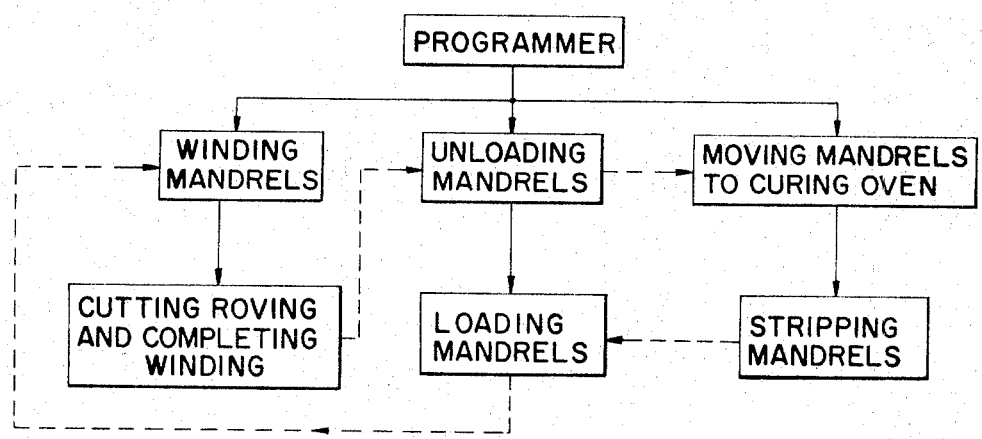
FIG. 7 is a diagram illustrating the sequence of the method steps of the invention.

The operations described herein are readily susceptible to automatic control of a programmer. FIG. 7 illustrates schematically that a programmer readily controls the operational steps of the method. Further, FIG. 7 illustrates how the several method steps are interrelated.

Several features and advantages of the invention will be evident to those skilled in the art,. Among these features and advantages is the fact that the winding of elongate mandrels to form tubular articles is fully automatic. No manual operations are required other than to replace empty spools of filamentary material from time to time and to mix and maintain a full supply of resin.

The operation of the machine being automatic, there is a considerable saving in operating costs and a more uniform product is produced.

A feature and advantage of the present invention is that elongate tubular articles may be more efficiently and quickly produced than by using apparatus available in the prior art.

Although the invention has been described herein with a certain degree of particularity, it is understood that the present disclosure has been made only as an example and that the scope of the invention is defined by what is hereinafter claimed.

What is claimed is:

1. The method for winding filamentary material onto mandrels comprising the steps:
   (a) supporting the mandrels between first spaced apart rotatable chuck and tail stock mechanisms, mounted in spaced apart first rotatable elements;
   (b) providing means to rotate each mandrel about its own axis;
   (c) providing means to rotate said first elements about an axis whereby each one of said mandrels moves selectively to a winding position;
   (d) moving a winding head relative to the one mandrel as it rotates about its own axis to wind said filamentary material helically onto said first one of said mandrels;
   (e) releasing a previously wound second mandrel from its respective chuck and tail stock mechanism and placing a third unwound mandrel in the support position between said chuck and tail stock mechanism;
   (f) rotating said elements so that the third mandrel moves from the support position to the winding position while simultaneously said first mandrel moves from the winding position to the support position;
   (g) severing said filamentary material at a point between said wound first mandrel and said unwound third mandrel;
   (h) releasing said wound first first mandrel and supporting in said chuck and tail stock mechanism an unwound fourth mandrel; and
   (i) repeating the foregoing steps to perform a cycle.

2. The invention of claim 1 including:
   (a) providing other mandrels between second spaced apart rotatable chuck and tail stock mechanisms mounted in spaced apart second rotatable elements;
   (b) providing means to rotate each other mandrel about its own axis;
   (c) providing means to rotate said second elements about an axis whereby said other mandrels move selectively to a winding position;
   (d) moving said winding head relative to the other mandrel in the winding position to wind said filamentary material helically onto said other mandrel;
   (e) releasing a wound other mandrel from its respective chuck and tail stock mechanism and placing an unwound other mandrel in place thereof;
   (f) rotating said second elements so that the unwound other mandrel rotates from a support position to the winding position and said wound mandrel moves from the winding position to said support position;
   (g) severing said filamentary material at a point between said wound mandrel and said unwound mandrel;
   (h) winding said filamentary material helically about said unwound mandrel; and
   (i) releasing said wound first mandrel from its respective chuck and tail stock mechanism and supporting in its place an unwound mandrel.

3. The invention of claim 1 including the steps of:
   (a) impregnating said filamentary material with a heat hardenable resin before it is wound onto said mandrel; and
   (b) moving said wound first mandrel into a curing oven.

4. The method for winding mandrels with filamentary material comprising the steps:
   (a) mounting mandrels between supports mounted to spaced apart rotatable elements, said mandrels being parallel to each other and parallel to an axis about which said elements rotate;
   (b) impregnating filamentary material with heat hardenable resin and then winding such filamentary material helically onto one mandrel at a winding location until said mandrel is wound as desired;
   (c) rotating said elements to move the wound one mandrel from the winding position to another spaced apart position and simultaneously,
   (d) moving another mandrel to the winding location;
   (e) severing the filamentary material at a point between said winding location and the other location; and
   (f) winding such resin impregnated filamentary material helically onto said other mandrel while simultaneously, (g) removing the wound one mandrel from said supports and replacing it with another unwound mandrel; and (h) moving each wound mandrel into an oven for curing said resin.

References Cited

UNITED STATES PATENTS

| | | | |
|---|---|---|---|
| 3,470,052 | 9/1969 | Herman | 156—450 X |
| 3,409,238 | 11/1968 | Campbell et al. | 242—35.5 R |
| 3,519,520 | 7/1970 | Newman, Jr. | 156—173 X |
| 1,719,738 | 7/1929 | Wayne | 156—425 |
| 3,607,566 | 9/1971 | Medney et al. | 156—448 X |
| 628,389 | 7/1899 | Bradley | 156—458 |
| 2,789,774 | 4/1957 | Petersen et al. | 242—18 A |
| 3,174,700 | 3/1965 | Lemaire | 242—18 A |
| 2,656,873 | 10/1953 | Stephens | 156—425 X |
| 2,862,541 | 12/1958 | Brink | 156—172 |

RALPH S. KENDALL, Primary Examiner

U.S. Cl. X.R.

156—446, 456, 425; 242—18 A